UNITED STATES PATENT OFFICE.

HENRY NOEL POTTER, OF NEW ROCHELLE, NEW YORK, ASSIGNOR TO GEO. WESTINGHOUSE, OF PITTSBURG, PENNSYLVANIA.

PAINT.

No. 880,737.

Specification of Letters Patent.

Patented Sept. 11, 1906.

Application filed January 25, 1905. Serial No. 242,667.

*To all whom it may concern:*

Be it known that I, HENRY NOEL POTTER, a citizen of the United States, and a resident of New Rochelle, county of Westchester, State of New York, have invented certain new and useful Improvements in Paints, of which the following is a specification.

In an application for Letters Patent of the United States, Serial No. 238,925, filed December 30, 1904, I have disclosed a new product—namely, silicon monoxid—and a method of producing the same. The monoxid constituting the product may appear and generally does appear in the form of an impalpable powder of a soft-brown color, although it sometimes appears in vitreous form, which may be reduced to a powder by suitable means.

I have found that silicon monoxid in a very finely-divided state forms an excellent basis for a paint and that when mixed with linseed-oil or other suitable vehicle it is easily spread, so as to form a paint either with or without the addition of coloring-matter other than the monoxid itself. When mixed with oil, oil and turpentine, or other usual vehicle in proper proportions, a true paint is produced which when laid upon a non-absorbent surface—such as metal, filled wood, &c.—gives a glossy enamel-like surface when dry. This gloss appears usually in the second coat upon porous surfaces—such as freshly-planed wood, brick, &c.—the first coat acting as a filler. The monoxid paint may be modified in color by adding colored pigments, the monoxid giving the body and slightly modifying the shade or color of the pigment added. A good red is produced with vermilion, a beautiful green with cobalt-blue or ultramarine, an intense black with ivory-black. The monoxid may of course be mixed with any suitable coloring-matter or combination of coloring materials to produce a variety of colors as may be desired.

The monoxid forms an excellent substitute for white lead as a material to be used in certain colored paints, and it is found that a given weight of the monoxid in its powdered form when combined with linseed-oil will give a much higher viscosity than the same weight of white lead, zinc-white, ochers, umbers, iron oxid pigments, graphite, or commercial lamp-black. This introduces a feature of great economy in connection with the use of silicon monoxid as a paint ingredient, aside from the peculiar translucent gloss or enamel-like quality noted above. Unlike white lead silicon monoxid is not attacked at ordinary temperatures which the dried oil will stand by gases containing sulfur compounds. It is found that the paint constituted, as described, adheres very firmly to the materials to which it is applied, so that, for example, a piece of tin or other sheet metal covered with paint of this description can be bent into sharp angles without causing any peeling of the paint. In fact, it is possible to bend the metal back and forth till it breaks, leaving the paint film unbroken. Such a film shows surprising elasticity. Owing to its lightness, silicon monoxid does not settle out of oil mixtures as does white lead, and to a certain extent seems to keep other solid ingredients in suspension, a fact of much importance in paints sold ready mixed.

The silicon monoxid produced as described in the application above referred to is usually associated with a small amount of impurities which do not appear to exercise any material deleterious effect upon the use of the monoxid as a paint ingredient, and it will be understood that when I speak of a paint comprising, among other things, the monoxid of silicon, I do not wish to be understood as necessarily excluding such impurities as may occur in the production of silicon monoxid in its powdered form as fully disclosed in the specification above referred to.

I claim as my invention—

1. A paint comprising silicon monoxid combined with a suitable vehicle.

2. A paint comprising silicon monoxid combined with an appropriate oil.

3. A paint comprising silicon monoxid combined with linseed-oil.

4. A paint comprising silicon monoxid combined with a coloring agent and an appropriate vehicle.

5. A paint comprising silicon monoxid combined with a coloring agent and linseed-oil.

6. A paint comprising silicon monoxid in the form of a powder combined with a suitable vehicle.

7. A paint having a basis of silicon monoxid.

8. A paint comprising silicon monoxid mixed with a drying-oil and a drier.

9. A paint comprising silicon monoxid mixed with pigment, drying-oil, and drier.

10. A paint comprising pigment containing silicon monoxid, combined with oil and drier to form a spreadable mass.

Signed at New York, in the county of New York and State of New York, this 24th day of January, A. D. 1905.

HENRY NOEL POTTER.

Witnesses:
WM. H. CAPEL,
GEORGE H. STOCKBRIDGE.